Patented May 21, 1940

2,201,168

UNITED STATES PATENT OFFICE 2,201,168

MANUFACTURE OF GELATIN

John Vernon Stuart Glass, Sutton Weaver, near Warrington, England, assignor to Imperial Chemical Industries Limited, a corporation of Great Britain No Drawing. Application August 23, 1938, Serial No. 226,377. In Great Britain August 27, 1937

12 Claims. (Cl. 260—118)

This invention relates to improvements in the manufacture of gelatin.

It is an object of this invention to improve the manufacture of gelatin. A further object is to reduce the time of the liming step in the manufacture of high grade gelatin. A still further object is to eliminate excessive supervision and control in the liming step of making gelatin. Other objects will appear hereinafter.

One step in the manufacture of high grade gelatin from osseine and similar equivalent materials is the treatment of the latter with a suspension of lime at ordinary temperatures for periods of up to two or three months. Such a treatment possesses obvious disadvantages on account of its prolonged nature, entailing considerable labour and supervision with consequent high cost and a comparatively large plant for a given output. Moreover, the gelatin-forming material is subjected to the hydrolyzing influence of the alkali throughout the treatment, and in consequence the maximum yield of gelatin is not obtained. Various proposals have been made to hasten the process or to replace it by another more rapid process, though none of them appears to give such a good quality gelatin as the normal liming process. Thus, it has been proposed to add caustic soda to the lime and to treat the raw materials with proteolytic enzymes, or with peroxides, e. g. sodium peroxide, and chlorine dioxide.

In my copending application Serial No. 159,995 of which this application is a continuation-in-part I have disclosed that I can reduce the time of the lime treatment to a period in the neighbourhood of four weeks by the addition to the lime suspension of from about 0.01% to 0.05% of a nontertiary amine such as methylamine, dimethylamine, ethylamine, n-propylamine, ethylmethylamine, n-butylamine, guanidine, ethylene diamine, hydrazine, hydroxylamine, and ring compounds such as piperidine, piperazine.

I have now found that I can further reduce the time to a period in the neighborhood of 2½ weeks by having present in the lime solution in addition to the amines of Serial No. 159,995 a quantity of between 0.1% and 5.0% of an alkaline earth metal halide, such as calcium chloride. In other respects the process is conducted in the usual manner, though on account of the accelerating effect of the added agents the time for which the treatment has to be continued is considerably lessened. Thus with the addition to the lime suspension of an amine alone, 4-5 weeks might be required to solubilize the osseine, with both the amine and 1-2% of calcium chloride and the time is lessened to 2½ weeks.

The following example illustrates but does not limit my invention.

Example

A batch of osseine was treated at 15° C. for 19 days with a lime suspension to which was added 0.1% methylamine and 2% calcium chloride, the suspension being changed several times during the interval. The osseine was then washed and extracted with water at 60° C. when 40% of the osseine was hydrolyzed in 3.1 hours, and gave a gelatin of excellent colour, clarity and jelly strength. A similar batch of osseine treated with a lime suspension to which was added 0.1% methylamine but no alkaline earth metal halide required 4½ weeks treatment before the osseine was as soluble and gave as good a gelatin.

The proportion of amine used should be between 0.01% and 0.5% and preferably between 0.05% and 0.1%, the preferred range of alkali metal halide being between 1% and 2%.

Instead of the calcium chloride used in the above example I could have used any halide of an alkaline earth metal.

Also in the above example instead of adding methylamine and calcium chloride I could have added methylamine hydrochloride or other methylamine halide which will react with the lime present to give a calcium halide.

As many apparently widely different embodiments of this invention may be made without departing from the spirit and scope thereof, it is to be understood that the invention is not limited to the specific embodiments thereof, except as defined in the appended claims.

I claim:

1. In the liming step in the manufacture of gelatin, the improvement which consists in adding a non-tertiary amine containing no negative group and an alkaline earth metal halide to the lime suspension.

2. In a process for the production of gelatin the step of treating a gelatin-forming material with a lime suspension containing an alkaline earth metal halide and a non-tertiary amine having less than 5 carbon atoms and containing no negative group.

3. In a process for the production of gelatin the step of treating osseine with a lime suspension containing an alkaline earth metal halide and a non-tertiary amine having less than 5 carbon atoms and containing no negative group.

4. In a process for the production of gelatin the step of treating osseine with a lime suspension containing from 0.01% to 5.0% of an alkaline earth metal halide and from 0.01% to 0.5% of a non-tertiary amine having less than 5 carbon atoms and containing no negative group.

5. In a process for the production of gelatin the step of treating osseine with a lime suspension containing from 1% to 2% of an alkaline earth metal halide and from 0.01% to 0.1% of a non-tertiary amine having less than 5 carbon atoms and containing no negative group.

6. In the process of making gelatin from gelatin forming materials by treatment with a lime suspension, the improvement which comprises adding a non-tertiary amine containing no negative group and an alkaline earth metal halide to the lime suspension.

7. In the process of making gelatin from gelatin forming materials of animal nature by treatment with a lime suspension, the improvement which comprises adding a non-tertiary amine having less than 5 carbon atoms containing no negative group and an alkaline earth metal halide to the lime suspension.

8. In the process of making gelatin from gelatin forming materials of animal nature by treatment with a lime suspension, the improvement which comprises adding a non-tertiary alkyl amine having less than 5 carbon atoms containing no negative group and calcium chloride to the lime suspension.

9. In a process for the production of gelatin the improvement which comprises carrying out the liming steps in the presence of a non-tertiary amine containing no negative group and an alkaline earth metal halide.

10. In the process for the production of gelatin the step of treating osseine with a lime suspension containing from 1% to 2% of calcium chloride and from 0.01% to 0.1% of a non-tertiary amine having less than 5 carbon atoms and containing no negative group.

11. In a process for the production from gelatin forming materials of animal origin, the improvement which comprises carrying out the liming step in the presence of methylamine and an alkaline earth metal halide.

12. In a process for the production from gelatin-forming materials of animal origin the improvement which comprises carrying out the liming step in the presence of methylamine and calcium chloride.

JOHN VERNON STUART GLASS.